United States Patent [19]

Gatten et al.

[11] 4,198,661

[45] Apr. 15, 1980

[54] CATHODE RAY TUBE BURN-IN PREVENTION APPARATUS

[75] Inventors: Ronald A. Gatten, San Jose; John C. Neves, Palo Alto, both of Calif.

[73] Assignee: American Optical Corporation, Southbridge, Mass.

[21] Appl. No.: 8,320

[22] Filed: Feb. 1, 1979

[51] Int. Cl.² .............................................. H04N 5/68
[52] U.S. Cl. .................................... 358/242; 358/220; 358/243; 315/383; 315/386
[58] Field of Search ............... 358/220, 237, 242, 243; 315/383, 384, 386

[56] References Cited

U.S. PATENT DOCUMENTS

| 2,971,116 | 2/1961 | Bendell | 358/220 X |
| 3,688,028 | 8/1972 | Altemus | 358/243 |

Primary Examiner—Robert L. Richardson
Attorney, Agent, or Firm—Jeremiah J. Duggan; Alan H. Spencer; Stephen A. Schneeberger

[57] ABSTRACT

In apparatus including a cathode ray tube, electrical circuitry for preventing "burn" spots in the phosphor of the cathode ray tube. The protective apparatus includes means to measure the rate of change of deflection of the electron beam of the cathode ray tube and means to measure the brightness level of the electron beam. The absolute value of the rate of change of the deflection of the beam is divided by the brightness level of the beam to produce a signal which is compared to a reference value. If the dividend exceeds the reference value, the CRT is shut down as in the preferred embodiment by blanking the cathode ray tube beam.

4 Claims, 2 Drawing Figures

CATHODE RAY TUBE BURN-IN PREVENTION APPARATUS

BACKGROUND OF THE INVENTION

A cathode ray tube may be permanently damaged if, during the operation thereof, the intensity of the spot formed on the cathode ray tube face is either too great or stays in one position for too long a period of time. It is possible for this damage to occur by virtue of failure of the deflection system of the cathode ray tube causing the electron beam to stay in one position for too long a period of time and burning a spot in the phosphor on the face of the tube.

It is recognized that the internal face of the cathode tubes are normally coated with phosphorescent materials which scintillate upon being impacted by the electrons of the electron beam. This phosphorescent material then scintillates causing light photons to be released which produces the "writing" on the face of the cathode ray tube.

It is well known that if the energy level of the electron beam reaches a certain intensity level, the scintillating characteristics of the phosphorescent material can be permanently damaged. This permanent damage is often observed as a "burn mark" on the face of the electron tube. This "burn mark" is produced by the failure of the phosphorescent material to scintillate when subsequently swept by the electron beam after having been onced damaged.

We have determined that "burns" may occur on the face of a cathode ray tube either over a short or long period of time. The burns occurring from a short period of time have been observed through such as the previously-mentioned failure of the cathode ray tube deflection system or by the beam essentially stopped scanning and impacted a given spot area on the cathode ray tube. Burns may additionally be caused in a cathode ray tube if the deflection rate of the beam is sufficiently slowed and the intensity of the beam itself is sufficiently high. It should be recognized that burns in the face of the cathode ray tube occur because of the exceeding of acceptable limits of phosphor on a given point of its tolerance to electron bombardment. It is thus recognized that a less intense beam, however stationary, may cause a burn equally as permanent as a high intensity beam being scanned at a slow rate of speed. Should the per-unit radiation of a given defined spot of phosphor exceed the tolerance limit of phosphor, the burn occurs, whether the beam is stationary or scanning.

High voltage shut-down circuits for cathode ray tubes are known in the art. For example, U.S. Pat. No. 4,045,742 issued Aug. 30, 1977 describes means for shutting down a cathode ray tube responsive either to excess of high voltage or beam current. Additionally, U.S. Pat. No. 3,546,536 issued Dec. 8, 1970 illustrates an alternative mechanism for shutting down a cathode ray tube (television set) when the voltage to the picture tube exceeds a predetermined level. In this instance, one at which excess X-radiation may eminate from the television receiver. U.S. Pat. No. 3,813,580 issued May 28, 1974 illustrates a high voltage protection circuit for a television receiver to blank the electron beam of a picture tube when the accelerating voltage to the cathode ray tube or picture tube exceeds a predetermined level.

The present invention has particular application to the field of scientific instruments wherein a cathode ray tube is used to portray an image of various information generated by the scientific instrument. In the case of the present embodiment, the cathode ray tube is the viewing tube of a scanning electron microscope wherein the beam of the cathode ray tube is synchronized with the beam of the electron microscope as it scans across the image area of a specimen. In the present described embodiment, the cathode ray tube is a high resolution tube having thereon approximately 4,000 lines and a special long-persistance phosphor. It should be recognized that such instruments may be particularly susceptible to burns by a beam if the scanning rate of the electron beam becomes too slow or the intensity of the beam itself as, for instance, in response to signals generated from the specimen surface, becomes too intense. It should also be recognized that damage to the cathode ray tube, instead of being in terms of a few hundred dollars for the replacement of the tube, may in such high resolution devices run to a few thousand dollars.

It should, therefore, be evident that apparatus within the scanning circuits of the cathode ray tube which prevent the possibility of the burning of the phosphor of the cathode ray tube, perform a useful and important function.

SUMMARY OF THE INVENTION

In apparatus including a cathode ray tube, electrical circuitry for preventing "burn" spots in the phosphor of the cathode ray tube. The protective apparatus includes means to measure the rate of change of deflection of the electron beam of the cathode ray tube and means to measure the brightness level of the electron beam. In a preferred embodiment, the absolute value of the rate of change of the deflection of the beam as measured by horizontal and vertical yoke current is divided by the brightness level of the beam to produce a signal which is compared to a reference value. If the dividend exceeds the reference value, the CRT is shut down as in the preferred embodiment by blanking the cathode ray tube beam. In an alternative embodiment, the scan rate of the beam may be measured by electrically calculating the square root of the sum of the squares of the horizontal and vertical yoke current measurement (having measuring voltage on the feedback resistor) and dividing this voltage calculation by the brightness level as measured by the voltage on a brightness level control or monitor, which is then compared to a predetermined reference value. As before, if the measured values exceed the predetermined value, the impact of the beam on the phosphor is interrupted by blanking the beam.

These and other objects and alternatives will be evident from the following description.

DESCRIPTION OF THE PREFERRED EMBODIMENT

As was stated in the objects of the present invention related earlier in the present specification, the present invention is to protect the phosphorescent coating of a cathode ray tube from burns. As previously described, "burns" may be generated by permanently damaging the phosphor of the cathode ray tube if the intensity of the irradiated spot is too great and/or stays in one position on the tube face for too long a period of time. It is thus recognized that an attempt to prevent such burns involves sensing both the rate of change of the deflection beam of the scanned cathode ray tube as well as monitoring the brightness value of a spot generated by the electron beam of the cathode ray tube.

With this in mind, the present invention takes the rate of change of beam deflection into consideration, monitoring this rate as well as the brightness level of the spot of the electron beam and then compares these with a predetermined relationship of these values which, if exceeded, the electron beam is extinguished in order to protect the phosphor of the cathode ray tube.

In the present invention, the rate of change of the deflection of the electron beam is attained by taking a derivative of the voltage waveform as seen at the feedback resistance in the deflection yoke of the cathode ray tube.

Figure 1:
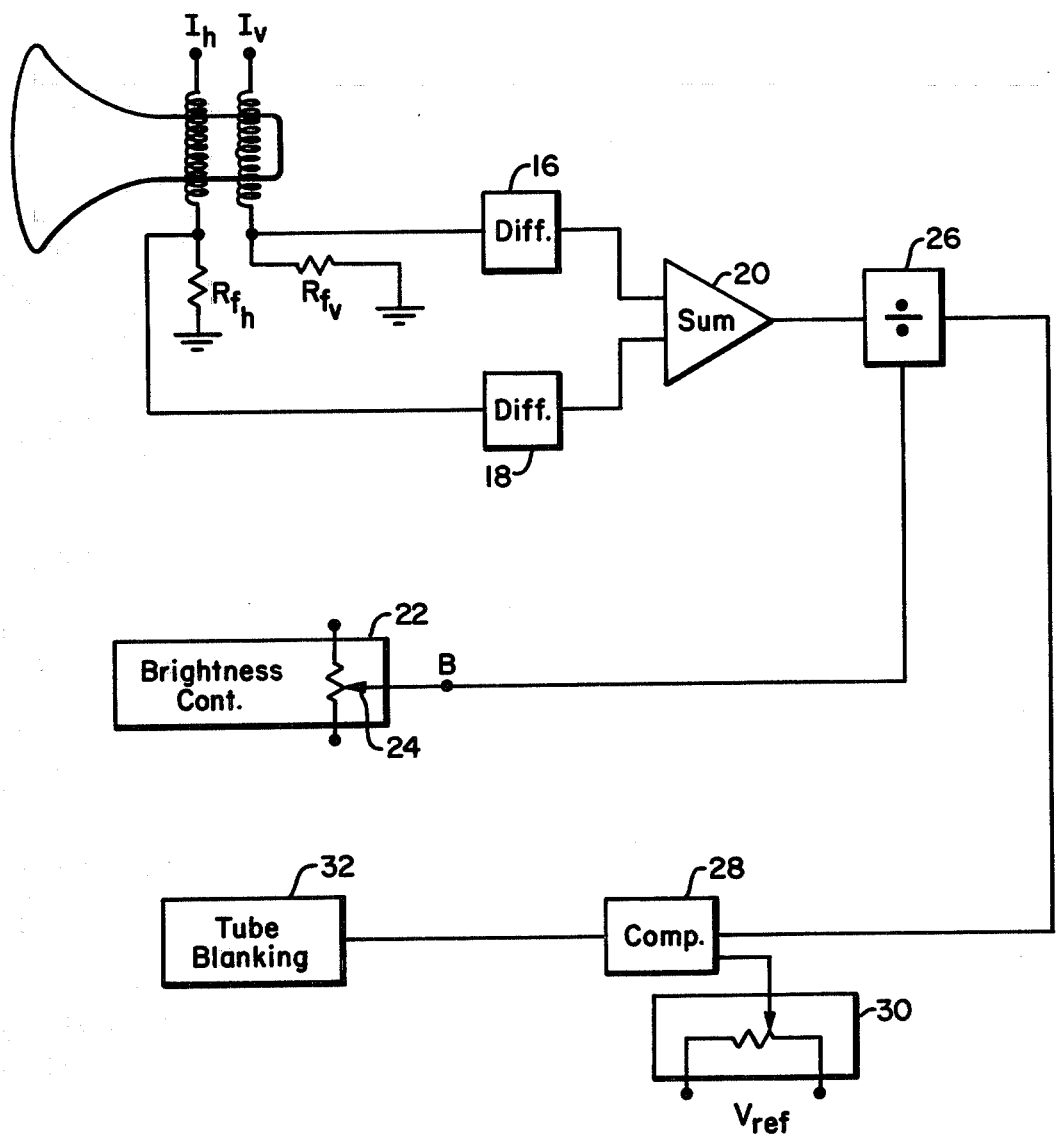
FIG. 1 is a partial block diagram representing the present invention.

This is illustrated in FIG. 1 wherein reference numeral 10 indicates the feedback resistance of the horizontal coil 11 of the deflection yoke and 12 indicates the feedback resistance of the vertical coil 13 of the deflection yoke of the cathode ray tube 14. Differentiators 16 and 18 are connected to the feedback resistances 10 and 12 respectively to obtain the derivative of the voltage waveform on these resistors. It should be appreciated that this measure of the waveform gives the rate of change of deflection since the magnetic deflection field of the CRT is generated by the current in the deflection yoke and it is strictly a function of the number of turns in the yoke and the current flowing therethrough. As should be appreciated by those skilled in the art, the current is related to the voltage by the feedback to resistance $R_f$ where by Ohms Law $V_f = I \times R_f$.

In order that deflection in both the vertical and horizontal loads may be monitored, the absolute values of each of the derivatives of the horizontal and vertical voltage waveform are summed in summing amplifier 20.

The brightness level of the electron beam of the CRT is conveniently monitored off of the brightness level control 22 of the instrument. It is common in devices employing cathode ray tubes for image production that a brightness level control is available for manual adjustment by an operator or viewer. As is in the case of the electron microscope, such a brightness level control is provided in a potentiometer, the controlling knob of which occurs on the face of the control panel of the instrument. Thus, by picking off the reference voltage at voltage wipers 24 of brightness level control potentiometer, the brightness level may be monitored and supplied to divider circuit 26. Thus, divider circuit 26 divides the sum of the absolute values of the rates of change of deflection of the beam of the CRT by the brightness level of the electron beam.

It may be recognized that taking the sum of the absolute value of the rate of change of the deflection is not the most exact method of determining movement of the electron beam in the scan pattern. A more exact or more correct method for determining the vector sum of deflection would be $D = \sqrt{H^2 + V^2}$ wherein D is the total deflection vector and H is the horizontal rate and V is the vertical rate. It may be recognized, however, that the use of the illustrated preferred and less accurate approach minimizes the cost of the electrical circuitry required. It should be recognized that it is within the skill of those skilled in the art to substitute summing and square root circuits to accurately measure horizontal and vertical rate and obtain the square root thereof, should specific application require a more accurate measurement of the rate of deflection of the electron beam. This may occur as in those installations wherein it is necessary to operate the cathode ray tube at brightness levels very close to the maximum tolerable by the phosphor. In such instances, a slight change in deflection rate not discernable by the absolute value method particularly described herein may be discerned by the square root method and adequate monitoring of deflection rate achieved.

The signal representing the measure of deflection rate divided by brightness is then supplied to comparator 28 wherein the value of the divider circuit 26 is compared with a reference value from potentiometer 30. The output of comparator 28 is then supplied to the control of the electron beam and a blanking control 32. Blanking to the CRT beam is conveniently accomplished by causing a switch to activate in response to a signal which indicates the quotient of deflection rate over brightness exceeding the tolerable level signaling existing cathode ray tube circuitry for blanking the beam.

Figure 2:
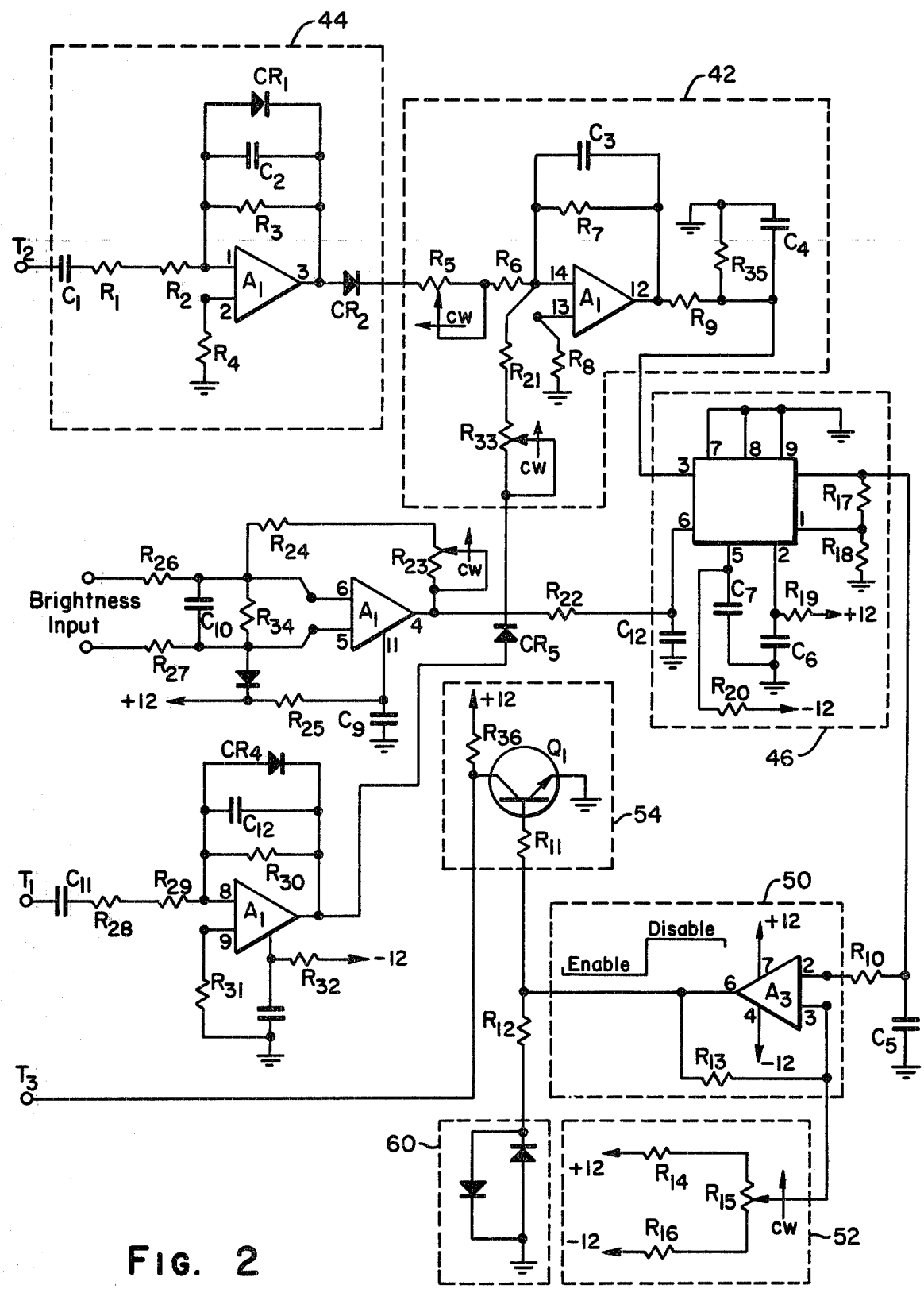
FIG. 2 is a detailed schematic of the present invention as embodied in a scanning electron microscope.

Turning now to FIG. 2, a specific preferred embodiment is illustrated as embodied in the display of a scanning electron microscope. Reference numeral 40 indicates the vertical absolute value detector and derivative circuit receiving its input from terminal T1 which in turn is connected to the feedback resistor for the vertical coil of the yoke. As illustrated, the vertical derivative circuit includes various coupling resistors and capacitors connected to an operational amplifier being one-fourth of an A1 741 integrated circuit. The output of the vertical absolute value and derivative circuit is applied to summing amplifier 42 which is also a portion of the same IC A1 741, the input to the summing amplifiers on terminal 14 thereof as is illustrated. Additionally, input thereto is the output of the horizontal absolute value and derivative circuit 44 which, similar to the vertical circuit, receives its input from the feedback resistor of the appropriate horizontal yoke indicated at terminal T2. Likewise, various coupling resistors and capacitors are connected to an operational amplifier being also one-fourth of an A1 741 integrated circuit. The output of summing amplifier 42 is supplied to the divider circuit 46 which, in the illustrated embodiment, is a 4205J IC, again illustrated with various coupling resistance and capacitance, input of the summing amplifiers on terminal 3 of the IC of the divider circuit. Also input thereto, however, on terminal 6 is the output of the brightness level control 48, the operative elements of which include an operational amplifier, again a portion of the IC A1 741 and various coupling resistance and capacitance. The output of the divider circuit is then input to comparator 50 which is an N5556V integrated circuit. Comparator 50 is connected to a threshold level device 52 being a combination of variable and fixed resistance and voltage source as illustrated. The output of the comparator is supplied to the base of a switching transistor 2N3903. When the level of the output of the comparator indicates the input exceeding the set threshold level, a voltage is applied to the base of the switching transistor 54 which in turn supplies a signal over conductor 56 to an enabling terminal T3 which in turn is coupled to the blanking circuit of the cathode ray tube. Additionally coupled to the output of the comparator circuit may be light emitting diode enabling indicators 60 which may alternately depend upon the ouput level of the comparator indicated as a red or green light indicating the state of the enabling circuit of the cathode ray tube protect device.

In FIG. 2, the following list of components by designation is provided:

| | |
|---|---|
| $R_1, R_2, R_{28}, R_{29}$ | 5 K ohms |
| $R_3$ | 470 K |
| $R_4, R_9, R_{10}, R_{11}, R_{31}$ | 10 K |
| $R_5, R_{33}$ | 1 K variable |
| $R_6$ | 200 |
| $R_7, R_{22}, R_{24}$ | 1 K |
| $R_8$ | 470 |
| $R_{12}$ | 680 |
| $R_{13}$ | 2.2 M |
| $R_{14}, R_{16}$ | 4.7K |
| $R_{15}$ | 5 K variable |
| $R_{17}, R_{18}$ | 5.1 K |
| $R_{19}, R_{20}$ | 100 |
| $R_{21}$ | 200 |
| $R_{23}$ | 20 K variable |
| $R_{25}, R_{32}$ | 47 |
| $R_{26}, R_{27}$ | 100 K |
| $R_{30}$ | 220 K |
| $R_{34}$ | 2 K |
| $R_{35}$ | 1.2 K |
| $R_{36}$ | 2.2 K |
| $C_1$ | 82 pf 10% |
| $C_2$ | 5 pf 10% |
| $C_3$ | 50 mf |
| $C_4, C_6, C_7, C_8, C_9, C_{13}$ | 1 mf |
| $C_5$ | .01 mf |
| $C_{10}$ | .1 mf |
| $C_{11}$ | .068 mf 10% |
| $C_{12}$ | 200 pf 10% |
| $CR_1, CR_2, Cr_4, CR_5, CR_6, CR_7$ | IN 914 |
| $CR_3$ | LED indicator |
| $Q_1$ | 2N3903 |

While particular embodiments of the invention have been shown and described, it would be obvious to those skilled in the art that changes and modifications may be made without departing from the invention in its broader aspects. Therefore, the aim in the appended claims is to cover all such changes and modifications as fall within the true spirit and scope of the invention.

We claim:

1. In an electronic instrument having a cathode ray tube display device in which an electron beam is directed to a screen having a phosphor, means for scanning said beam in a raster pattern on said screen, means for blanking said beam during a portion of said raster pattern and means for adjusting the brightness of said beam on said screen, the improvement comprising:

means for detecting the scan rate of said beam, means for monitoring the brightness of said beam, means for measuring the relative value of the relationship of the detected scan rate of said beam and the monitored brightness of said beam means for comparing the said relative value to a predetermined limit, and means for generating a blanking signal to said blanking means when said relative value exceeds said predetermined value, whereby said beam will be blanked during periods when said beam impact on said phosphor screen would exceed a predetermined acceptable level.

2. The improvement according to claim 1 wherein said means for detecting the scan rate of said beam includes means to measure the current in the horizontal and vertical deflection coils of said cathode ray tube.

3. The improvement according to claim 2 wherein the absolute value of said current measurements are summed and subsequently divide by the brightness measure of said beam.

4. The improvement according to claim 1 wherein the square root of the sum of the square of the vertical and horizontal defelction current measurements are divided by the brightness measure of said beam.

* * * * *